United States Patent [19]

Stedman

[11] 4,413,708

[45] Nov. 8, 1983

[54] INDUSTRIAL TRUCK WITH PIVOTAL FRONT FRAMES

[75] Inventor: Robert N. Stedman, Chillicothe, Ill.

[73] Assignee: Caterpillar Tractor Co., Peoria, Ill.

[21] Appl. No.: 355,052

[22] Filed: Mar. 5, 1982

[51] Int. Cl.³ .......................... B66B 9/20; B62D 57/00

[52] U.S. Cl. .................................... 187/9 R; 188/140; 188/7 R; 280/638; 414/635; 414/664

[58] Field of Search ................. 414/635,644; 187/9 R; 180/7.1, 140; 280/96, 638

[56] References Cited

U.S. PATENT DOCUMENTS

| | | | |
|---|---|---|---|
| 1,282,598 | 10/1918 | Lamb | 180/258 |
| 2,752,058 | 6/1956 | Gibson | 414/664 X |
| 3,001,601 | 9/1961 | Aghnides | 180/75 |
| 3,039,268 | 6/1962 | Shaffer . | |
| 3,212,594 | 10/1965 | Scott | 180/7 |
| 3,273,665 | 9/1966 | Goodacre . | |
| 3,306,390 | 2/1967 | Jamme | 180/46 |
| 3,364,874 | 1/1968 | Toennesen | 180/7.1 X |
| 3,388,820 | 6/1968 | Lebre | 187/9 R X |
| 3,586,183 | 6/1971 | Shaffer . | |
| 3,655,005 | 4/1972 | Chicurel | 180/7 R |
| 3,908,849 | 9/1975 | Carroll . | |
| 3,915,252 | 10/1975 | Datta et al. | 180/72 |

*Primary Examiner*—Robert G. Sheridan
*Attorney, Agent, or Firm*—Phillips, Moore, Lempio & Finley

[57] ABSTRACT

Industrial trucks commonly include a unitary frame having a roller mast and carriage assembly mounted forwardly thereon. The ability of such trucks to traverse narrow aisles is limited and their stability is normally increased with use of outriggers, counterweights, or the like. The vehicle (10) of this invention, such as an industrial truck, comprises a rear frame (14) and a pair of laterally spaced front frames (16) pivotally mounted forwardly on the rear frame (14). A roller mast (20) and carriage (26) is adapted to be mounted forwardly on the rear frame (14), between the front frames (16). The vehicle (10) will thus exhibit high degrees of maneuverability and stability by its ability to pivot the front frames (16) towards and away from each other, depending on the job task under consideration.

6 Claims, 8 Drawing Figures

INDUSTRIAL TRUCK WITH PIVOTAL FRONT FRAMES

DESCRIPTION

1. Technical Field

This invention relates generally to a material handling vehicle and more particularly to an industrial truck having a pair of laterally spaced front frames pivotally mounted on a rear frame.

2. Background Art

Industrial trucks normally include a unitary frame mounted on a pair of steerable rear wheels and a pair of driven front wheels. A roller mast and carriage assembly, having lift forks, is mounted forwardly on the frame. Although industrial trucks of this type have met with widespread commercial success, their ability to traverse narrow aisles is limited.

In addition, in order to improve the stability of the truck during loading and roading, the truck is either constructed with a wider dimension or outrigger-type stabilizers and/or counterweights employed therewith.

The present invention is directed to overcoming one or more of the problems as set forth above.

DISCLOSURE OF INVENTION

In one aspect of the present invention, a vehicle comprises a rear frame mounted on at least one wheel, a pair of laterally-spaced front frames each mounted on a wheel, and pivot means for pivotally mounting each of the front frames forwardly on the rear frame for transverse pivotal movement thereon.

The improved vehicle embodying this invention is thus highly maneuverable and capable of transversing narrow aisles by pivoting the front frames inwardly towards each other and will also exhibit a high degree of stability when the front frames are pivoted away from each other to widen the vehicle. Increasing the stability of the vehicle in this manner is particularly useful during loading and unloading operations. This invention finds particular application to industrial trucks, primarily intended for the movement of objects or materials and usually associated with manufacturing, processing, or warehousing operations.

BRIEF DESCRIPTION OF THE DRAWINGS

Other objects and advantages of this invention will become apparent from the following description and accompanying drawings wherein.

BEST MODE OF CARRYING OUT THE INVENTION

Figure 1:
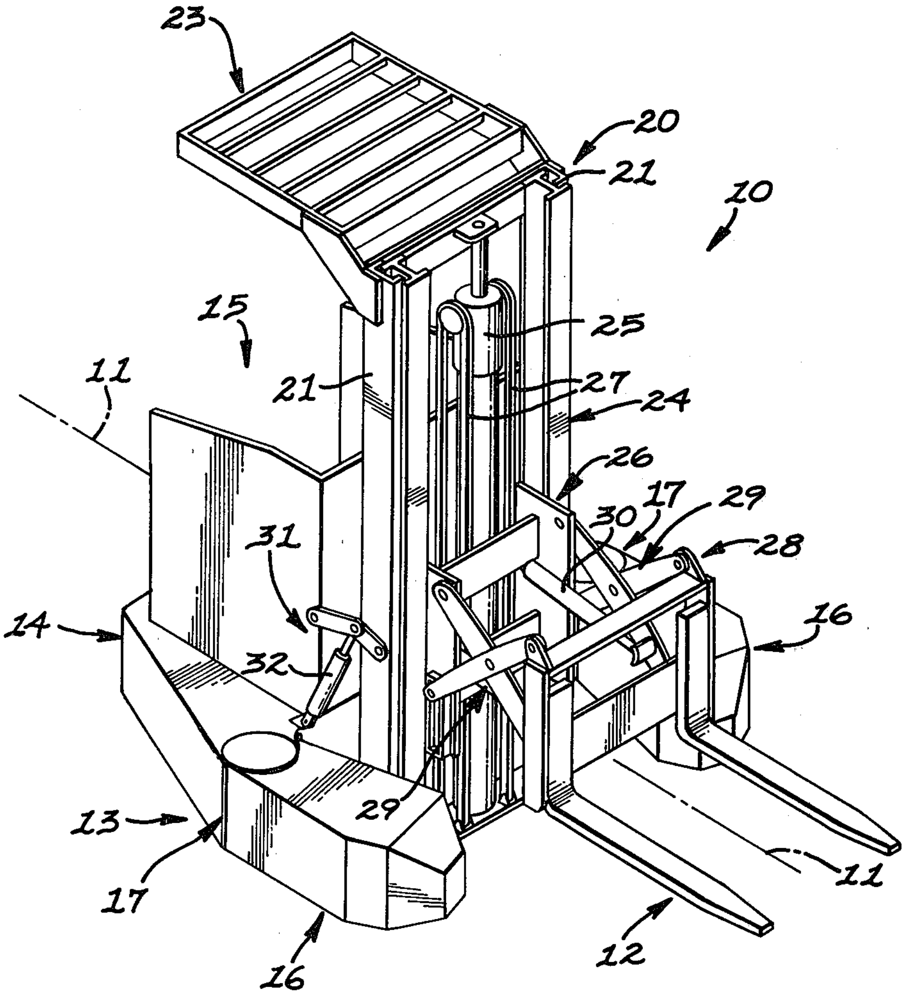
FIG. 1 is a front isometric view of a vehicle embodiment of the present invention.
Figure 2:
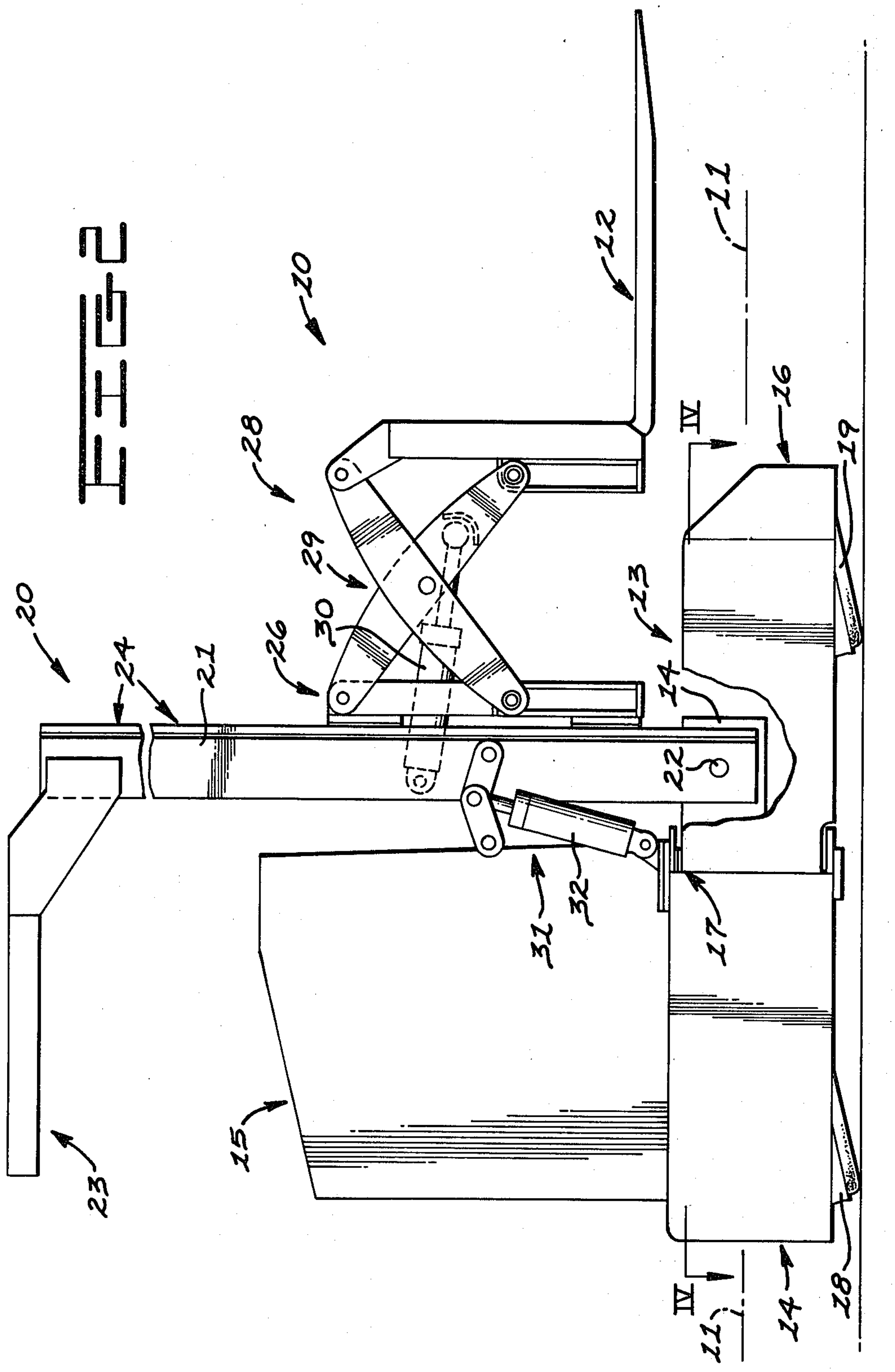
FIG. 2 is an enlarged side elevational view of the vehicle.
Figure 3:
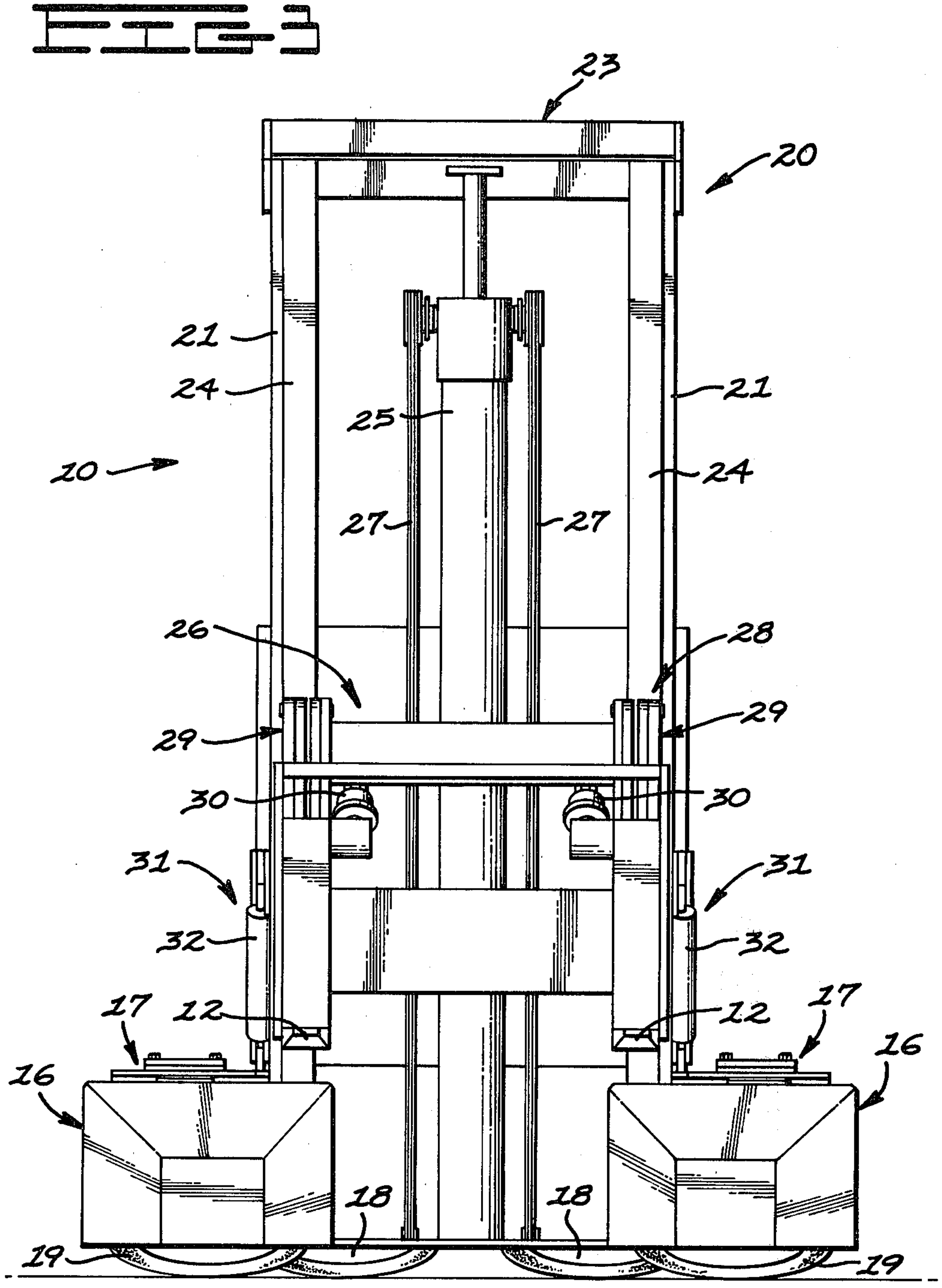
FIG. 3 is an enlarged front elevational view of the vehicle.

FIGS. 1–3 illustrate a vehicle 10 in the form of an industrial truck disposed on a longitudinal axis 11 thereof. A work tool is shown in the form of a pair of laterally spaced lift forks 12, adapted for engaging and supporting loads in a conventional manner. It should be understood that other types of work tools could be substituted in lieu of the lift forks, such as a carton, bale, paper roll, barrel, or general purpose clamp. Also, such substitution could take the form of a standard earthworking tool, such as a loader bucket or bulldozer blade.

Figure 4:
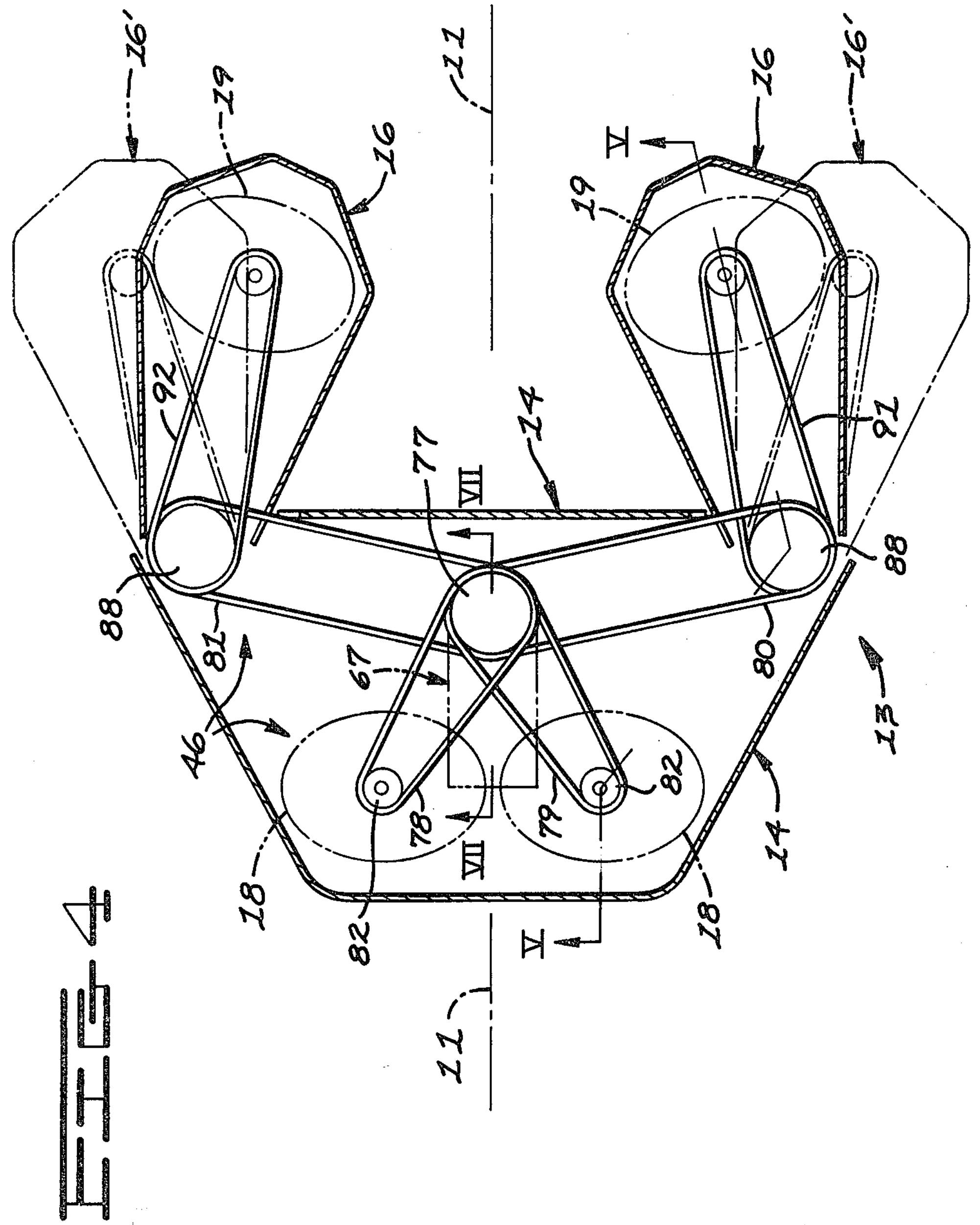
FIG. 4 is a top plan sectional view, generally taken in the direction of arrows IV—IV in FIG. 2, schematically illustrating pivotal positions of a pair of front frames, pivotally mounted on a rear frame of the vehicle, and also illustrating a drive system for wheels of the vehicle.

The vehicle includes a frame assembly 13 composed of a rear frame 14 having an operator's station 15 mounted thereon and a pair of laterally-spaced front frames 16. As described more fully hereinafter, a pivot means 17 pivotally mounts each of the front frames forwardly on the rear frame for pivotal movement of the front frames towards and away from each other and axis 11. As shown in FIGS. 2–4, at least one and preferably two ground-engaging rear wheels 18 are mounted beneath the rear frame, whereas at least one ground-engaging front wheel 19 is mounted beneath each front frame.

Figure 8:
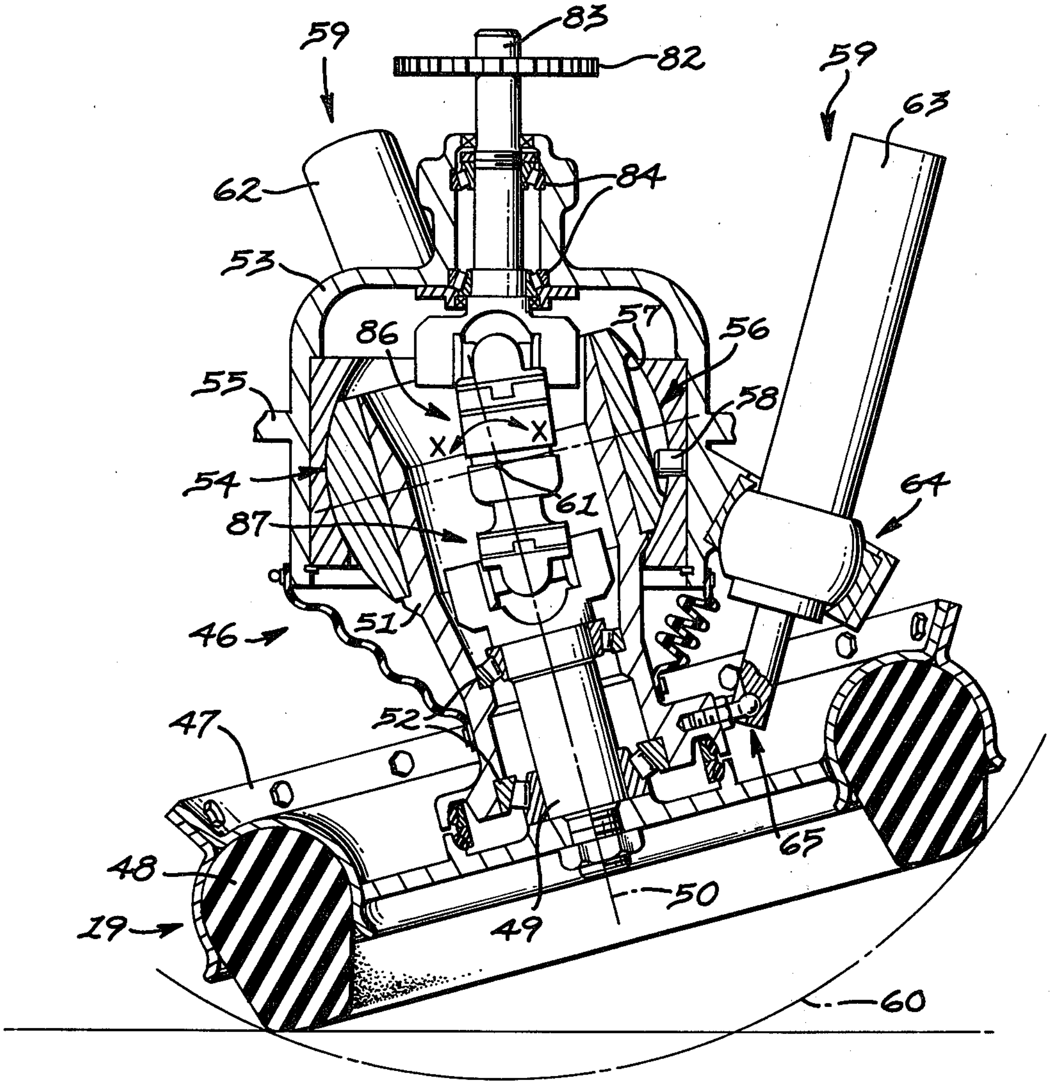
FIG. 8 is an enlarged sectional view illustrating a typical mounting and drive arrangement for one of the wheels.

Since the front frames and their attendant structures, including pivot means 17, are substantially identical, only one will be described in detail. In addition, each of the wheels 18 and 19 and their attendant support and drive mechanisms are substantially identical in construction and arrangement, as illustrated in FIG. 8.

Returning once again to FIGS. 1–3, lift forks 12 are mounted on an extensible roller mast assembly 20 that includes an upright mast 21 having opposite sides thereof pivotally mounted forwardly on rear frame 14 by a pair of pivot pins 22 (one shown in FIG. 2). An overhead guard or protective structure 23 is secured on an upper end of mast 21 to overlie operator's station 15. Mast assembly 20 further includes a movable mast 24 composed of a pair of laterally spaced uprights, slidably mounted for vertical movement on mast 21 by a double-acting hydraulic lift cylinder 25, interconnected between masts 21 and 24. A carriage assembly 26 is mounted for vertical movements on mast 24, under control of standard lift chains 27.

Lift forks 12 are mounted on carriage assembly 30 by a reach mechanism 28 comprising a pair of laterally spaced pantographs 29. The scissors-type pantographs are adapted to be expanded and contracted to selectively move the forks relative to the carriage assembly under the control of a pair of double-acting hydraulic cylinders 30, each pivotally interconnected between a lever of a respective pantograph and a bracket (not shown) secured to the carriage assembly. A tilting mechanism 31, including a double-acting hydraulic cylinder 32, is interconnected between each side of mast 21 and a structural member of operator's station 15 to selectively tilt mast assembly 20 about pivot pins 22 (FIG. 2). From the above description it can be seen that lift forks 12 may be selectively raised, lowered, moved forwardly and rearwardly, and tilted to perform various material-handling tasks.

Figure 5:
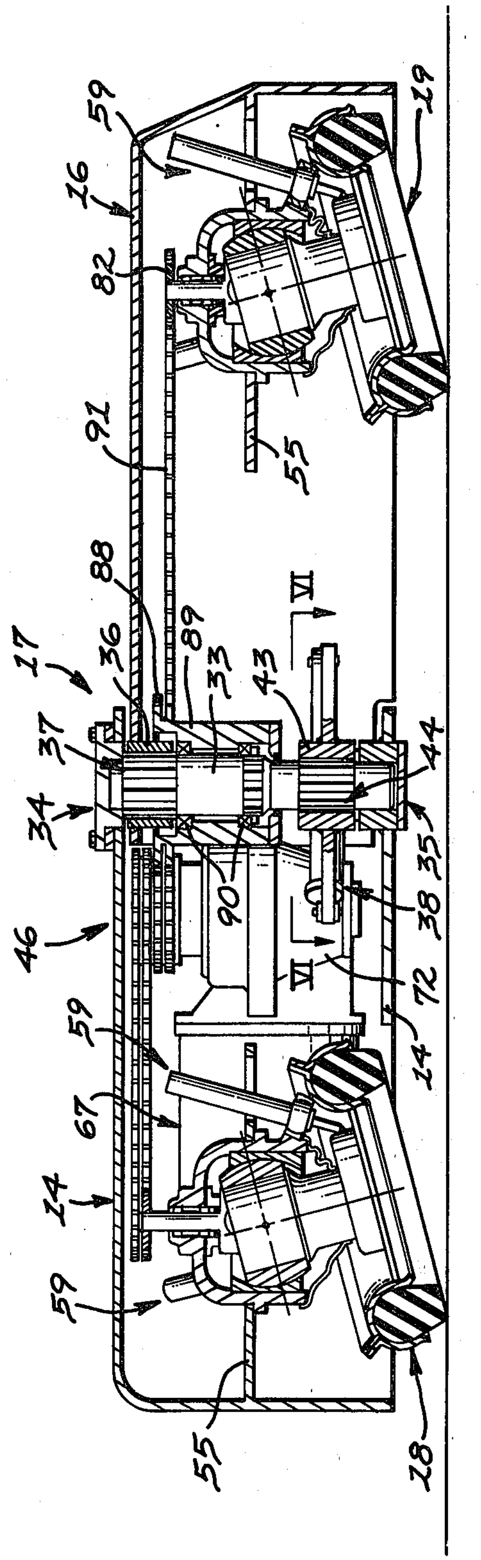
FIG. 5 is an enlarged sectional view, taken in the direction of arrows V—V in FIG. 4, illustrating the pivotal connection between a front frame and the rear frame, as well as the drive system for the wheels.
Figure 6:
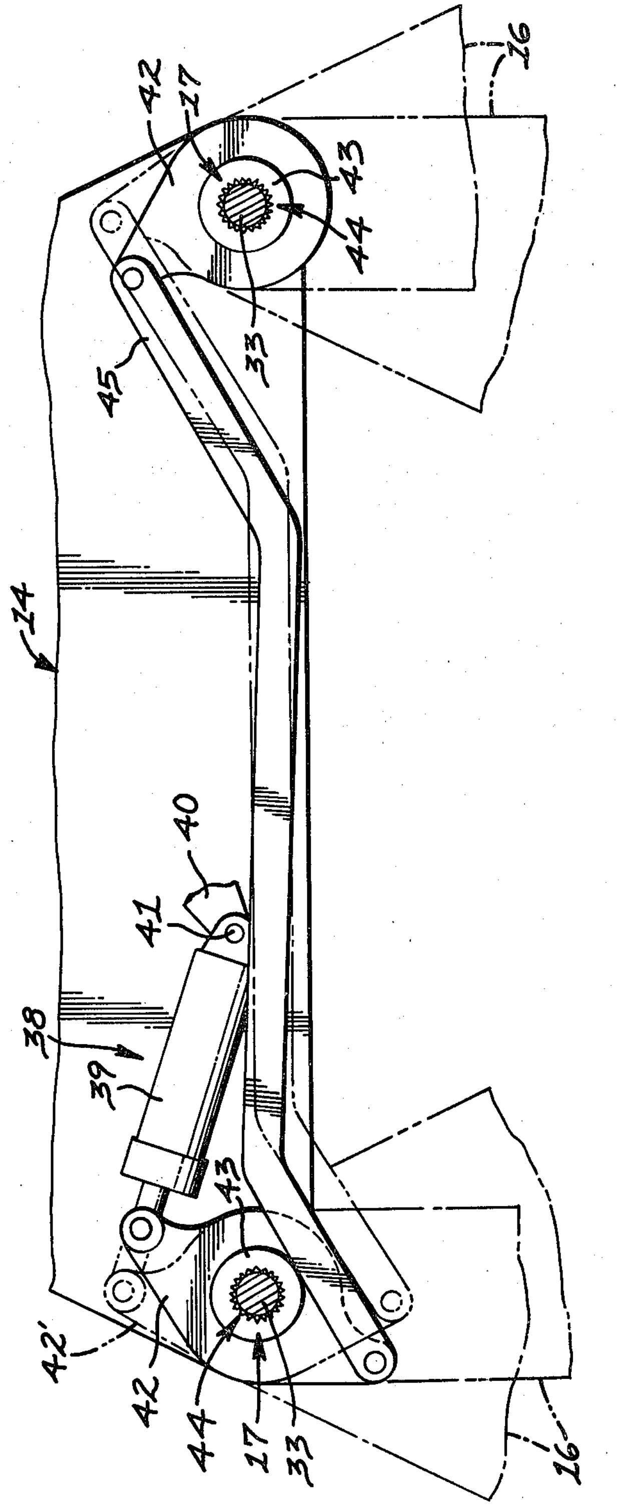
FIG. 6 is an enlarged sectional view, taken in the direction of arrows VI—VI in FIG. 5, illustrating the pivotal connection between the front frames and the main frame and an interconnection between the front frames.

Referring to FIGS. 4–6, each pivot means 17 includes a vertically-disposed shaft 33 having upper and lower ends thereof journaled on the rear frame at pivot connections 34 and 35 (FIG. 5). A bushing 36 is welded or otherwise suitably secured to each front frame 16 and is releasably secured to shaft 33 by a spline connection 37. Referring to FIG. 6, an actuating means 38 for simultaneously pivoting front frames 16 on rear frame 14 includes a double-acting hydraulic cylinder 39 having its first or head end pivotally attached to a bracket 40, secured to rear frame 14, by a pivot pin 41.

The second or rod end of the cylinder is pivotally attached to a lever 42 whereby selective retraction and extension of the cylinder will pivot the lever about the longitudinal axis of shaft 33, between its solid line position 42 and its phantom line position 42'. As shown in FIGS. 5 and 6, lever 42 is secured on a hub 43, secured to a lower end of shaft 33 at a spline connection 44. Thus, pivotal movement of the lever and hub will impart pivotal movement to front frame 16 through spline connection 44, shaft 33, and spline connection 37. As shown in FIG. 6, a tag link 45 is pivotally interconnected between levers 42, secured to the respective shafts 33, to simultaneously pivot front frames 16 towards or away from each other in a lateral direction in response to selective extension or retraction of cylinder 39.

FIGS. 4 and 5 illustrate a drive means or system 46 adapted to drive one or more of the wheels of vehicle 10 and to provide the vehicle with multidirectional movement capabilities, if so desired. Although this drive system is preferred, it should be understood that other types of drive systems could be utilized without departing from the spirit and scope of the invention. For example, standard swivel-type casters or rollers could be substituted in lieu of front wheels 19. Also, although the vehicle is preferably driven by at least one rear wheel 18, in a non-driven vehicle application, such as a hand truck, the rear wheel or wheels could also comprise casters or rollers. Therefore, the term "wheel" as used herein should be understood to broadly cover the above types of caster and rollers and the like. When a single wheel is utilized in lieu of the illustrated pair of rear wheels 18, the single wheel would be preferably positioned and mounted centrally (approximately on axis 11), beneath rear frame 14 (FIG. 4).

Referring to FIG. 8, each wheel 19 (as well as each wheel 18) is shown as comprising an annular rim 47 having an elastomeric plastic or rubber tire 48 secured therein. The rim is secured to a centrally-disposed spindle 49 that rotates the wheel about a central axis 50 of the wheel. The shaft is rotatably mounted in a hub 51 by a pair of axially-spaced, tapered roller bearing assemblies 52. As shown in FIGS. 5 and 8, hub 51 is mounted for universal movement in a wheel mounting housing 53 by a swivel joint 54 of the ball and socket type.

The housing is secured to a mounting plate 55, secured to front frame 16. The swivel joint includes stop means 56 for limiting the pivotal and rotational movement of hub 51 within a predetermined range of angles (e.g., 30° in all directions), including in the direction of arrow X—X in FIG. 8, in a direction perpendicular to such arrow, and in an infinite number of directions therebetween. The stop means includes a generally circular recess 57 formed in a ball segment of the joint and a cooperating pin 58, secured in the socket portion thereof to extend into the recess.

A wheel positioning means 59 is adapted to selectively and infinitely orient each wheel 18 and 19 relative to ground level along an imaginary spherical segment 60, having its center at a pivot point 61 (FIG. 8). The wheel positioning means may include a pair of double-acting hydraulic cylinders 62, 63 circumferentially spaced approximately 90° from one another about central and rotational axis 50 of the wheel and radially outwardly from the axis. As further shown in FIG. 8, the housing of each cylinder is attached to wheel mounting housing 53 by a swivel ball joint 64 (one shown) and the rod end of the cylinder is pivotally attached to hub 51 by a ball and socket connection 65.

As mentioned above, each wheel 18 and 19 is mounted beneath the vehicle in the above-described manner to be selectively oriented individually or in unison to control movement of the vehicle in any chosen direction. The various wheel positioning means 59 can also be actuated to position all of the wheels in the same flat plane on ground level to establish a stable base for lifting or placing loads or for parking purposes. This capability, when utilized in association with the spreading-out of front frames 16 relative to each other in the above-described manner, will provide a stable platform for such job tasks.

Figure 7:
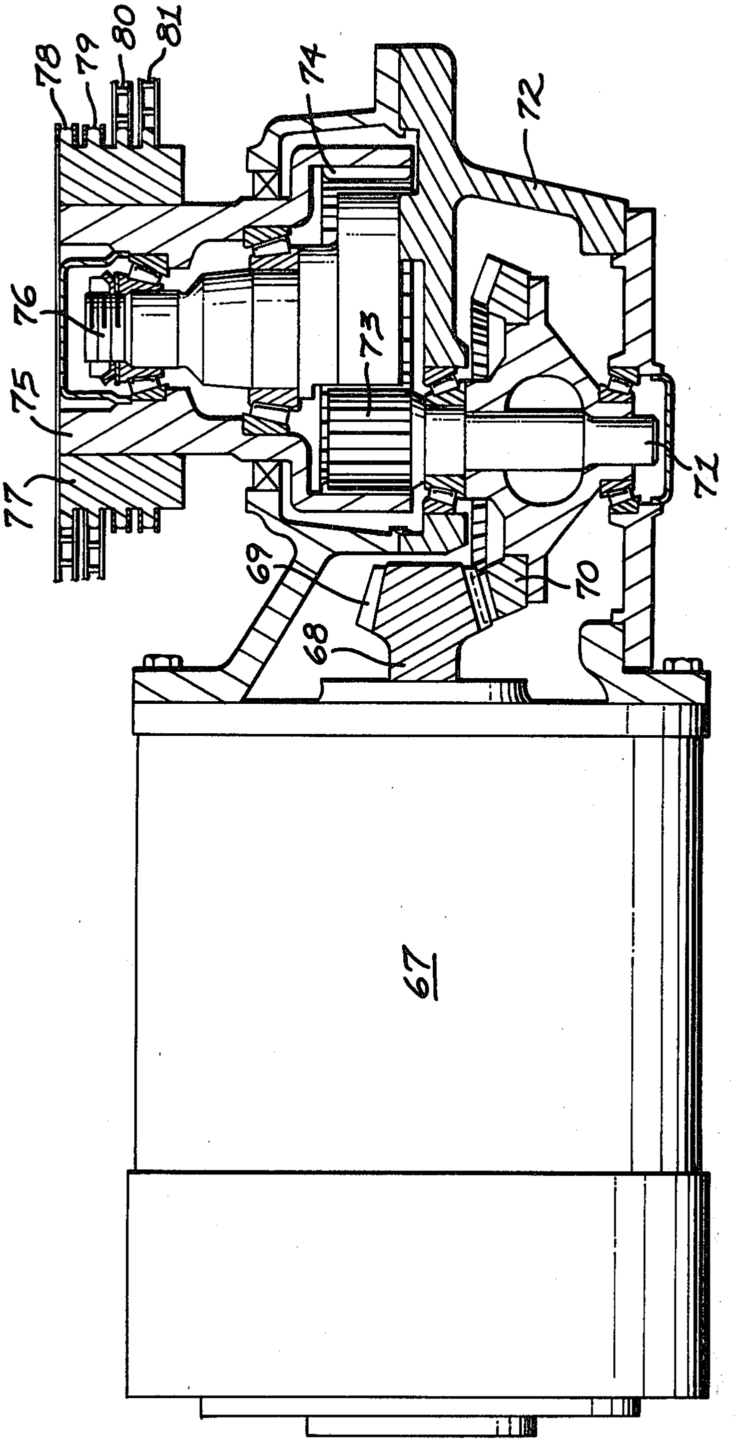
FIG. 7 is an enlarged sectional view, taken in the direction of arrows VII—VII in FIG. 4, illustrating a drive motor and transmission arrangement employed in the drive system of the vehicle.

Referring to FIGS. 4, 5, and 7, wheels 18, 19 are driven simultaneously by drive system 46, including a main drive motor 67 having an output shaft 68 (FIG. 7). If so desired, a variable speed transmission (not shown) can be associated with the motor in a conventional manner. Output shaft 68 has a pinion gear 69 secured thereon that meshes with a face gear 70, secured to a shaft 71 rotatably mounted in a housing 72 secured to rear frame 14. A pinion gear 73 is secured to an upper end of shaft 71 and meshes with an internal ring gear 74, secured within a sprocket hub 75.

The sprocket hub is rotatably mounted on an upright spindle 76, secured to housing 72 by a pair of suitably arranged bearing assemblies, as shown in FIG. 7. A main drive sprocket 77 is secured on an upper end of hub 75 and has four endless chains 78–81 entrained therearound to be driven thereby. It can thus be seen that rotation of motor output shaft 68 in FIG. 7 will impart drive to chains 78–81 via face gear 70, shaft 71, pinion gear 73, ring gear 74, hub 75, and drive sprocket 77. As shown in FIGS. 4 and 5, each chain 78–81 is adapted to drive a respective wheel 18, 19. Each chain 78 and 79 is directly interconnected between sprocket 77 and a respective input sprocket 82 to provide the drive input to each rear wheel 18, as shown in FIGS. 4 and 8. As mentioned above, the wheel support and drive arrangement for each wheel 18 and 19 is identical, as shown in FIG. 8.

Sprocket 82 is secured to a shaft 83 rotatably mounted on wheel mounting housing 53 by a pair of axially spaced tapered roller bearing assemblies 84. Shaft 83 is coupled to spindle 49 by an Oldham coupling 86 and a Hook's coupling or Carden-type universal joint 87. The spindle is secured to rim 47 of the wheel and is rotatably mounted in the hub by bearing assemblies 52, as described above. Coupling 86 will compensate for misalignment between shaft 83 and spindle 85, whereas universal joint 87 will allow universal positioning of the wheel by cylinders 62, 63 without affecting the power transmission to the wheel.

Referring once again to FIGS. 4 and 5, each chain 80 and 81 is interconnected between sprocket 77 and a dual idler sprocket 88, secured to a hub 89 rotatably mounted on shaft 33 by a pair of axially-spaced bearing assemblies 90. Each sprocket 88 is further connected to input sprocket 82 of a respective front wheel 19 by a chain 91 or 92. It can be seen in FIG. 5 that idler sprocket 88 is mounted for rotation about a vertical axis that is common to a vertical pivot axis of pivot means 17, about which each front frame 16 pivots on rear frame 14 under the control of actuating means 38 (FIGS. 5 and 6).

INDUSTRIAL APPLICABILITY

In operation, industrial truck 10 will exhibit road handling and stability characteristics that cannot be achieved with conventional industrial or lift trucks. Although the truck is preferably utilized with infinitely adjustable wheels 18, 19, it should be understood that other types of wheels or rollers can be substituted therefor, as described above.

The improved stability of the truck during loading and load-carrying operations is enhanced by the relatively low center of gravity thereof and the ability to spread front frames 16 to their phantom line positions 16', shown in FIG. 4. In addition, and as further described above, wheels 18, 19 can be moved into flat positions on the ground during loading operations to further increase the stability of the truck.

When the operator desires to pick-up and transport a palletized load, he will position the truck adjacent to the load and then spread-out front frames 16 to their 16' (FIG. 4) positions by retracting cylinder 39 (FIG. 6). Tag link 45 will ensure that the front frames are moved simultaneously. As suggested above, the operator can selectively actuate cylinders 62, 63 to place the wheels flat on the ground to further increase the stability of the vehicle for load lifting purposes.

As shown in FIG. 1, pantographs 29 can then be extended forwardly of the truck by extending cylinders 30 whereafter the forks and pallet can be raised by extending cylinder 27 to raise carriage assembly 26. If so desired, the operator can also selectively extend and retract cylinder 25 to aid in properly positioning the forks under the pallet. Once the carriage assembly and forks have been raised above front frame 16, as shown in FIG. 2, cylinders 30 can be retracted to move the pallet and carried load closely adjacent to the mast assembly.

The operator can then selectively actuate cylinder 62, 63 to place wheels 18, 19 in their proper orientation relative to ground level to move the vehicle in any desired direction under the control of motor 67. In certain applications wherein the truck is moved through a narrow aisle, it may prove desirable to lower forks 12 and the load carried thereby onto front frames 16 which have been moved inwardly towards each other previously, under control of cylinder 39, to reduce the overall width of the truck. It can be seen that relatively heavy loads can be carried and moved by the truck without the need for additional counterweights secured rearwardly on the truck, which is conventional practice.

The truck can be steered in any desired direction without changing the vehicle's orientation (axis 11 in FIG. 1). This steering arrangement permits vehicle movement in the normal forward and reverse directions and also permits the vehicle to crab, i.e., sideways or diagonally. Also, the operator can execute a right-angle or spot turn by suitably changing the orientation of either the two front wheels, the two rear wheels, or both sets of wheels in opposite directions with respect to ground level. The vehicle, therefore, can be advantageously used to manipulate and transport loads in narrow aisles and other confined spaces whereat conventional lift trucks cannot maneuver freely.

Other aspects, objects, and advantages of this invention can be obtained from a study of the drawings, the disclosure, and the appended claims.

I claim:

1. A vehicle (10) disposed on a longitudinal axis (11) thereof comprising:
a rear frame (14),
at least one ground-engaging rear wheel (18) mounted beneath said rear frame (14),
a pair of laterally-spaced front frames (16),
at least one ground-engaging front wheel (19) mounted beneath each of said front frames (16),
pivot means (17) for pivotally mounting each of said front frames (16) forwardly on said rear frame (14) for pivotal movement towards and away from said axis (11), said pivot means (17) having a pivot shaft (33) secured to each of said front frames (16) and an actuating means (38) for selectively rotating said pivot shaft (33), and
drive means (46) for rotating each of said front and rear wheels (18,19), said drive means (46) including an idler sprocket (88) rotatably mounted on said pivot shaft (33) and flexible drive means (91,92) for drivingly interconnecting a said idler sprocket (88) with each of said front wheels (19).

2. The vehicle (10) of claim 1 wherein said actuating means (38) includes a double-acting cylinder (39) pivotally interconnected between said rear frame (14) and said pivot shaft (33).

3. The vehicle (10) of claim 1 wherein said drive means (46) further includes a main drive motor (67), a main drive sprocket (77) connected to an output shaft (68) of said motor (67) to be driven thereby, and flexible drive means (78–81) interconnected between said main drive sprocket (77) and each of said rear wheels (18) and each said idler sprocket (88).

4. An industrial truck (10) disposed on a longitudinal axis (11) thereof comprising:
a rear frame (14),
at least one ground-engaging rear wheel (18) mounted beneath said rear frame (14),
a pair of laterally-spaced front frames (16),
at least one ground-engaging front wheel (19) mounted beneath each of said front frames (16),
pivot means (17) for pivotally mounting each of said front frames (16) forwardly on said rear frame (14) for pivotal movement towards and away from said axis (11), said pivot means (17) including a pivot shaft (33) secured to each of said front frames (16),
actuating means (38) for selectively rotating said pivot shaft (33) and for pivoting said front frames (16) simultaneously,
drive means (46) for driving at least one (18) of said front (19) and rear (18) wheels,
said drive means (46) rotates each of said front and rear wheels (18,19), said drive means (46) including an idler sprocket (88) rotatably mounted on said pivot shaft (33) and flexible drive means (91,92) for drivingly interconnecting a said idler sprocket (88) with each of said front wheels (19), a mast assembly (20) mounted forwardly on said rear frame (14), and a work tool (12) mounted forwardly on said mast assembly (20).

5. The industrial truck (10) of claim 4 wherein said actuating means (38) includes a double-acting cylinder (39) pivotally interconnected between said rear frame (14) and said pivot shaft (33).

6. The industrial truck (10) of claim 5 wherein said drive means (46) further includes a main drive motor (67), a main drive sprocket (77) connected to an output shaft (68) of said motor (67) to be driven thereby, and flexible drive means (78–81) interconnected between said main drive sprocket (77) and each of said rear wheels (18) and each said idler sprocket (88).

* * * * *